United States Patent [19]
Preston

[11] Patent Number: 5,941,362
[45] Date of Patent: Aug. 24, 1999

[54] DROP DELIVERY CHUTE

[76] Inventor: John Clement Preston, 196 Silverwater Road, Silverwater, New South Wales 2124, Australia

[21] Appl. No.: 08/693,140
[22] PCT Filed: Feb. 24, 1995
[86] PCT No.: PCT/AU95/00094
§ 371 Date: Sep. 12, 1996
§ 102(e) Date: Sep. 12, 1996
[87] PCT Pub. No.: WO95/23264
PCT Pub. Date: Aug. 31, 1995

[30] Foreign Application Priority Data

Feb. 28, 1994 [AU] Australia ............................... PM 4154
Mar. 28, 1994 [AU] Australia ............................... PM 4754

[51] Int. Cl.⁶ ............................. B65G 11/02; B65G 11/18
[52] U.S. Cl. ................................................. 193/34; 193/33
[58] Field of Search ............................... 193/2 R, 33, 34; 232/44

[56] References Cited

U.S. PATENT DOCUMENTS 1,877,234  9/1932  Gallagher ................................. 193/34
1,886,793  11/1932  Davidson ................................. 193/34
3,931,877  1/1976  Albaugh ................................... 193/34
4,640,403  2/1987  McDermott .............................. 193/34

*Primary Examiner*—William E. Terrell
*Assistant Examiner*—Mark Deuble
*Attorney, Agent, or Firm*—James Ray & Associates

[57] ABSTRACT

A drop delivery debris disposal chute formed of a continuous trough sectioned body having an open face, and a plurality of cover elements each secured to span the open face to constitute a respective part of a closure wall of the chute, wherein each of a plurality of duct access openings in the closure wall is constituted by a gap between neighboring spaced apart cover elements, and at least two inlet structures supporting the duct fixedly mounted to a building floor and including an intake opening and an inclined race extending from the intake opening to a corresponding duct access opening, and wherein the spacing between neighboring duct access openings is established to bring each access opening into register with the race of a corresponding inlet structure by use of a cover sheet in overlapping relationship with a cover element.

6 Claims, 5 Drawing Sheets

DROP DELIVERY CHUTE

BACKGROUND OF THE INVENTION

1. Field of the Invention

This invention relates to chutes for the drop delivery of material, articles or other items from the upper floors of a multi-storey building to a lower level. Such chutes (referred to as drop delivery chutes hereinafter) provide a quick and inexpensive means for delivering items to, for example, a ground floor or basement destination, when the items are either able to withstand the fall without damage or where damage is of no consequence.

The invention was developed for application to temporary drop delivery chutes as frequently used for the disposal of rubbish or debris from the above ground floors of a multi-storey building during construction of the building, and is described herein primarily with reference to drop delivery chutes for that usage. It will be appreciated however that it is applicable to drop delivery chutes generally, including permanent chutes such as those used, for example, for the delivery of soiled bed linen or the like from hospital wards to a basement laundry or collection facility.

2. Description of the Prior Art

The big majority of prior known drop delivery chutes for the disposal of debris during the construction of a multi-storey building have been of two types:

(i) Chutes comprising a plurality of truncated conical duct modules strung together to form an elongated downwardly extending duct wherein each module feeds into the one below. Usually the modules are only loosely linked together and require special arrangements for their overall support. Debris and like materials may be fed into the open top of the duct, but such chutes usually do not allow for the in-feed of material at points along the length of the duct. They are therefore expensive, time consuming to erect, limited as to the number of floors that may be serviced simultaneously and, because of their discontinuous nature they may release a good deal of dust into the atmosphere when in use.

(ii) Chutes comprising a downwardly extending, fabricated metal duct and a plurality of inlet structures permitting material to be delivered into the duct at each floor serviced by the chute. Such multiple inlet chutes are usually secured by tie-beams or the like to the building structure, although it has been proposed hitherto to anchor the inlet structures to the respective floors for the support of the chute as a whole. The duct may be continuous, that is to say devoid of loose or ill fitting joints, and therefore may be substantially dust tight, but chutes of this kind and their supporting structures have usually been tailor made for each site, which is an expensive, and in the case of temporary rubbish disposal chutes, a particularly wasteful procedure.

Attempts have been made to provide multiple inlet, debris disposal chutes with continuous ducts utilising re-useable duct modules. Those modules have been in the form of open-topped and open-bottomed fabricated metal boxes, of which some are furnished with an inlet opening. In use they are fastened together, one upon another, to form a continuous duct. However, the floor spacing in multi-storey buildings varies from site to site, and this has meant that either a tailor made, non-standard "module" has been required between each floor or that each regular inlet module has not been able to be optimally placed relative to each floor for ease and convenience of use.

SUMMARY OF THE INVENTION

An object of the present invention is to provide a drop delivery chute having multiple inlets and a substantially continuous, preferably re-useable, duct which may be more readily adjusted insofar as the vertical spacing between adjacent duct access openings is concerned than has been the case in the ducts of prior known chutes of that type.

According to a first aspect the invention consists in a drop delivery chute comprising a continuous duct which itself comprises a trough sectioned body having an open face, and a plurality of cover elements adapted to span the open face to constitute a closure wall of the duct; and means to secure the cover elements to the body, which means permit the respective cover elements to be secured at any position along the length of the body as needed to form the closure wall; wherein each of a plurality of duct access openings in the closure wall is constituted by a gap between neighbouring spaced apart cover elements.

In preferred embodiments the duct is modular and the body comprises a plurality of open ended, trough sectioned body modules adapted to be joined end to end and upended to form a continuous, upright body.

Preferred embodiments of the invention further comprise a plurality of at least two inlet structures supporting said duct, each inlet structure being adapted to be fixedly mounted to a building floor and comprising means defining an intake opening and an inclined race extending from said intake opening to a corresponding duct access opening.

In such preferred embodiments, wherein there are a plurality of inlet structures disposed one above the other in respective association with a plurality of floors of a multi-storey building, variations in the spacing between neighbouring duct access openings, as may be needed to bring each access opening into register with the race of a corresponding inlet structure, may be accommodated by providing a non-modular cover of appropriate width intermediate of each pair of neighbouring access openings; but, more simply, and preferably, a fill-in cover panel is provided, which may or may not be identical with the first mentioned cover elements, and is adapted to overlap its adjacent cover module to a greater or lesser extent as needed to adjust the total cover length between duct access openings.

In still further preferred embodiments the inlet structure is constructed so that its inclined race feeds into a duct access opening situated in the closure wall that is a side wall of the duct, that is to say a wall that is generally perpendicular to the edges of the floors on which the inlet modules are mounted.

For preference the duct is merely clamped to the inlet structures to facilitate erection of the chute, and enable the position of the open bottom end of the duct to be set as needed irrespective of the altitude of the lowermost inlet structure.

BEST MODE OF CARRYING OUT THE INVENTION

Figure 1:
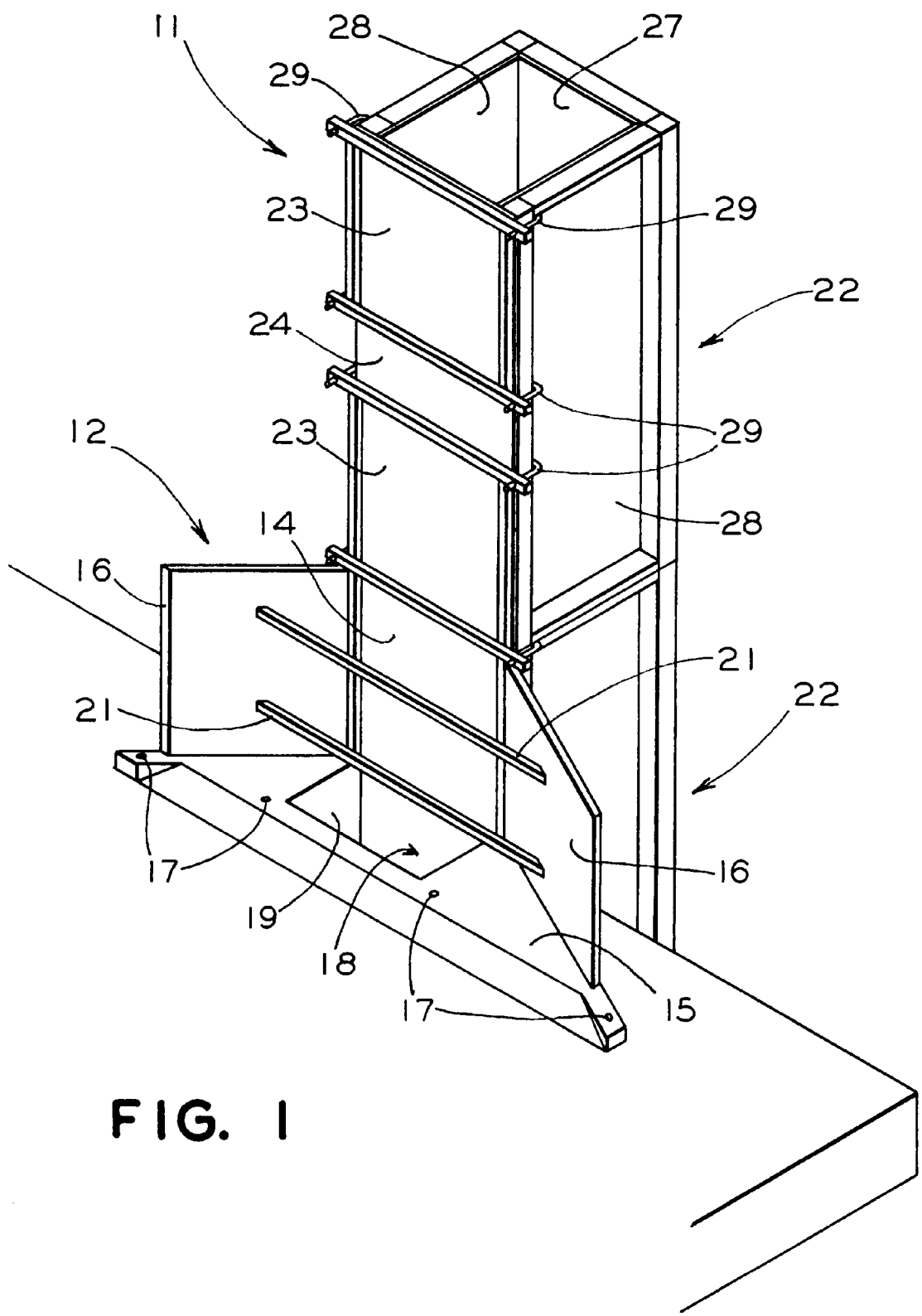
FIG. 1 is a diagrammatic perspective view of a portion of a drop delivery chute according to the invention, namely an inlet structure and portion of a vertical duct.
Figure 2:
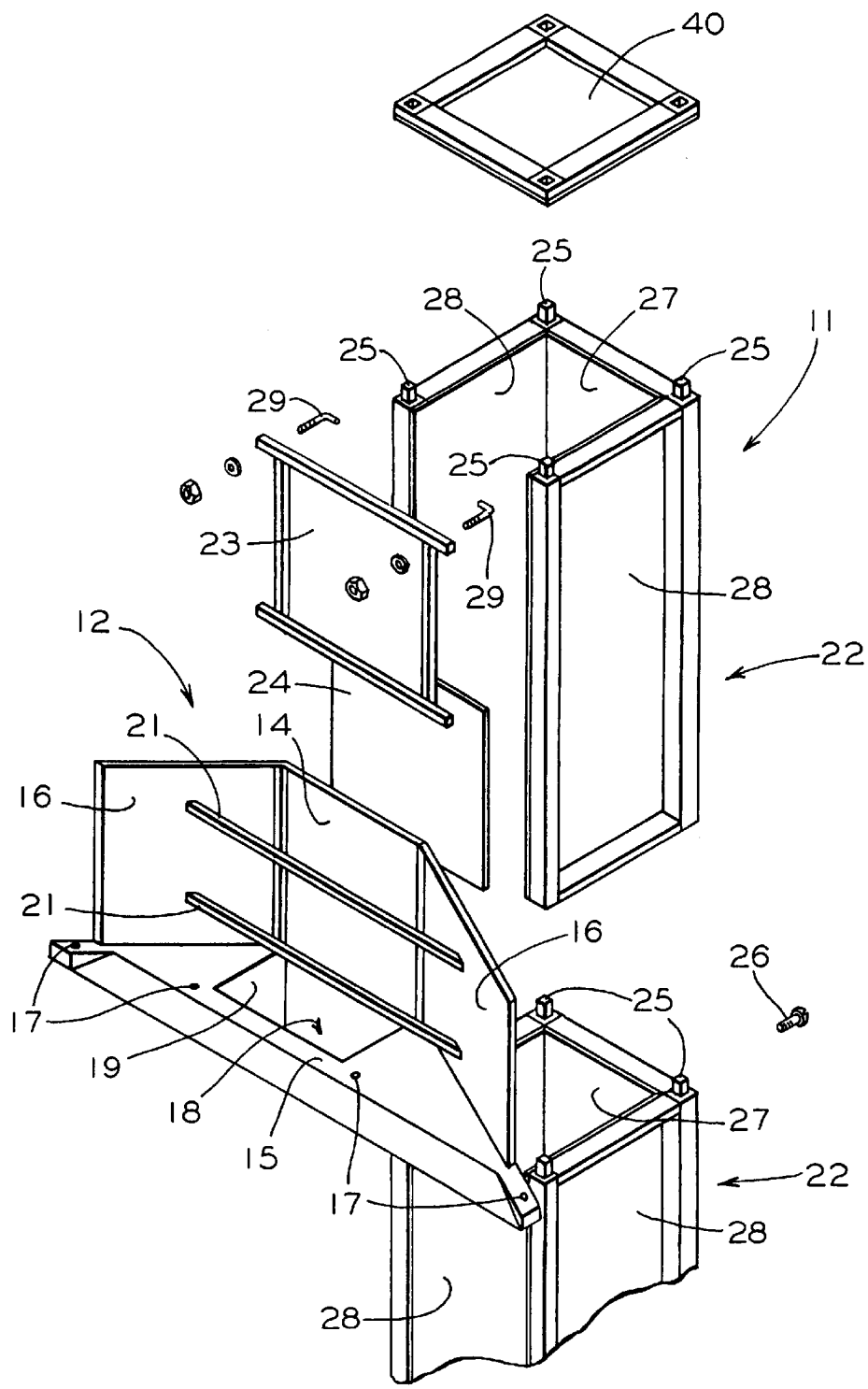
FIG. 2 is a view similar to FIG. 1 of the same subject matter with the modular components thereof shown separated.
Figure 3:
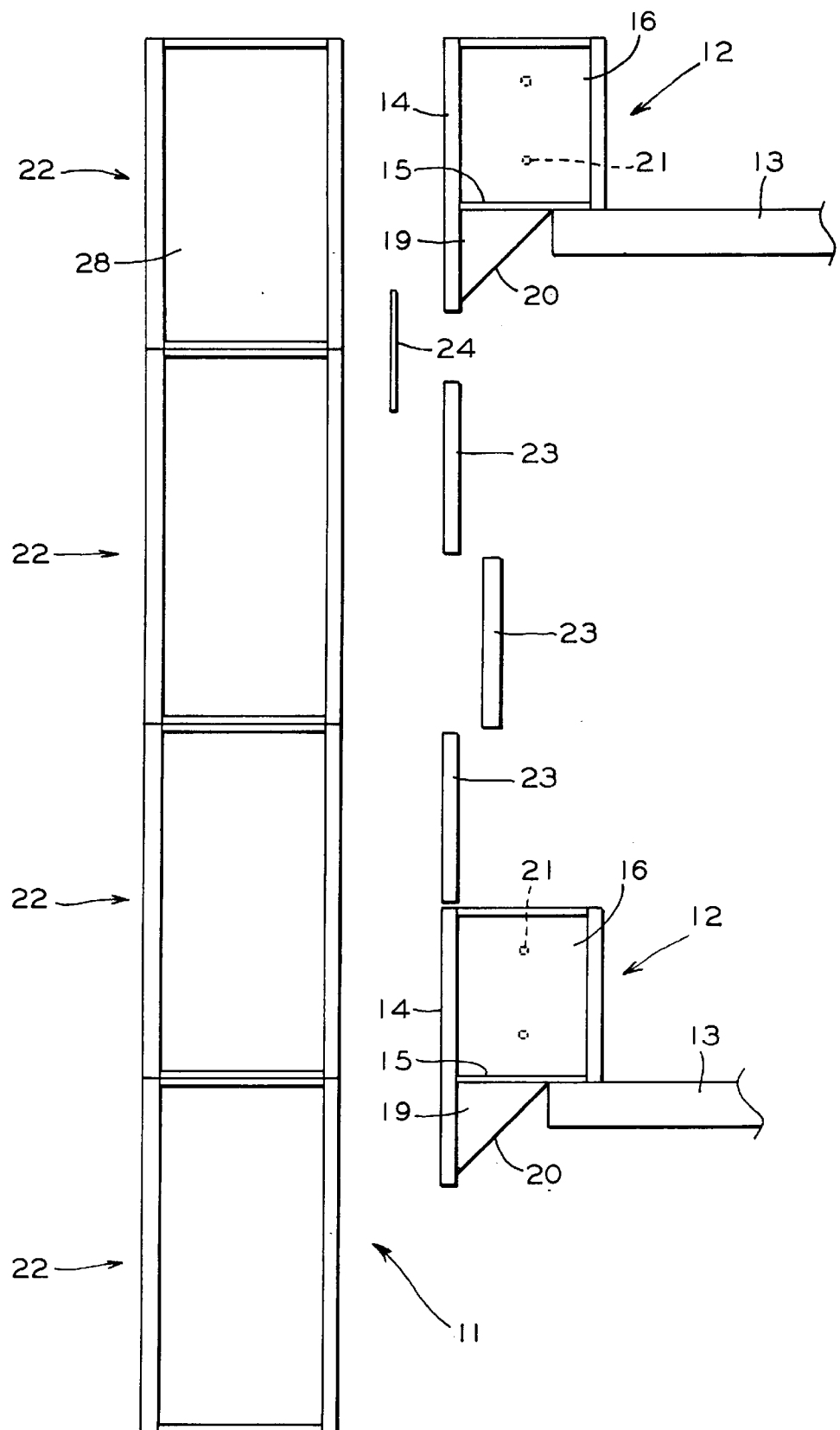
FIG. 3 is a diagrammatic side elevation of a larger portion of the chute of FIG. 1, showing two inlet structures and with some of the modular components of the duct separated.
Figure 4:
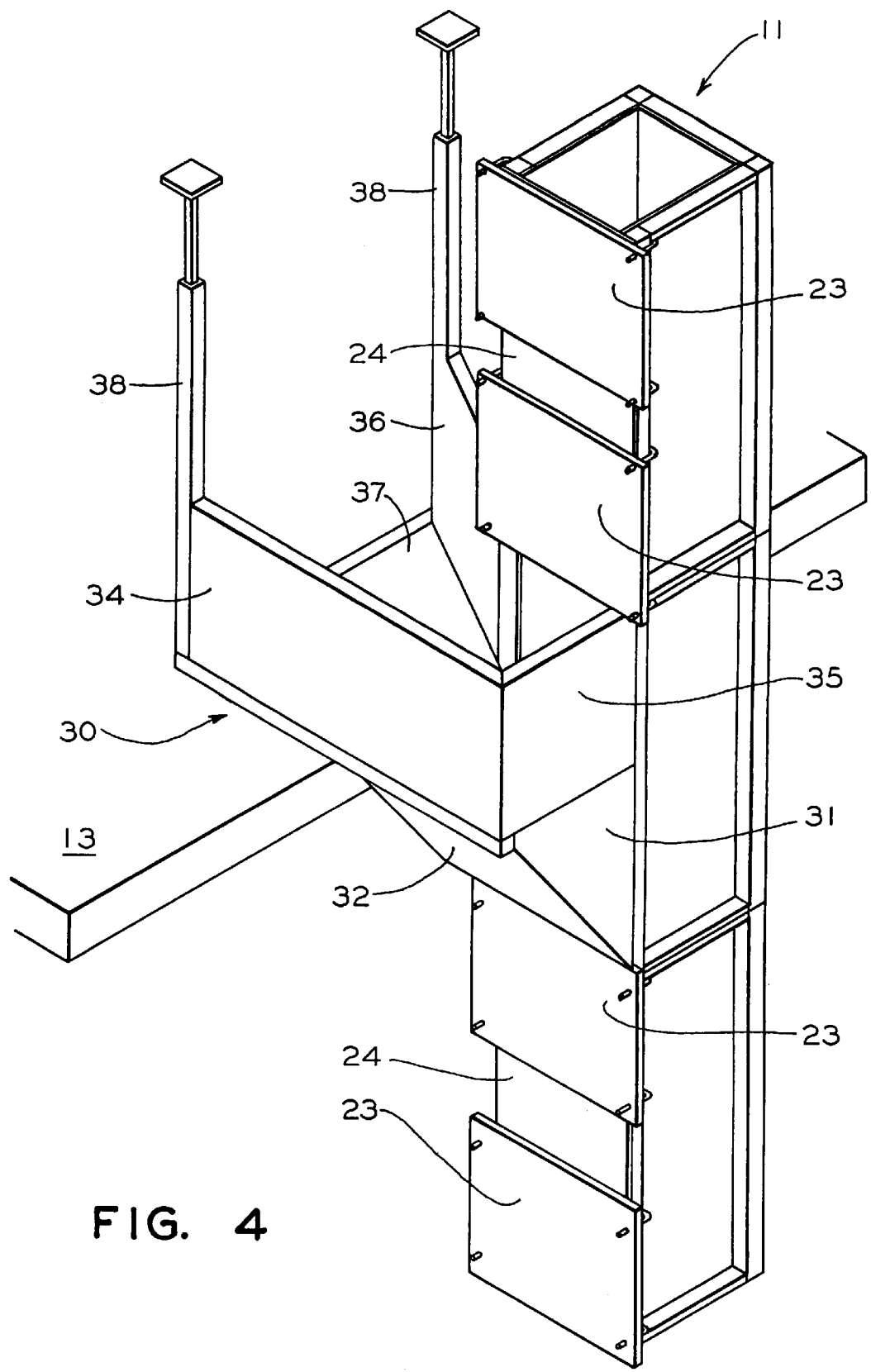
FIG. 4 is a diagrammatic perspective view of a portion of an alternative drop delivery chute according to the invention, namely an inlet structure and portion of a vertical duct.
Figure 5:
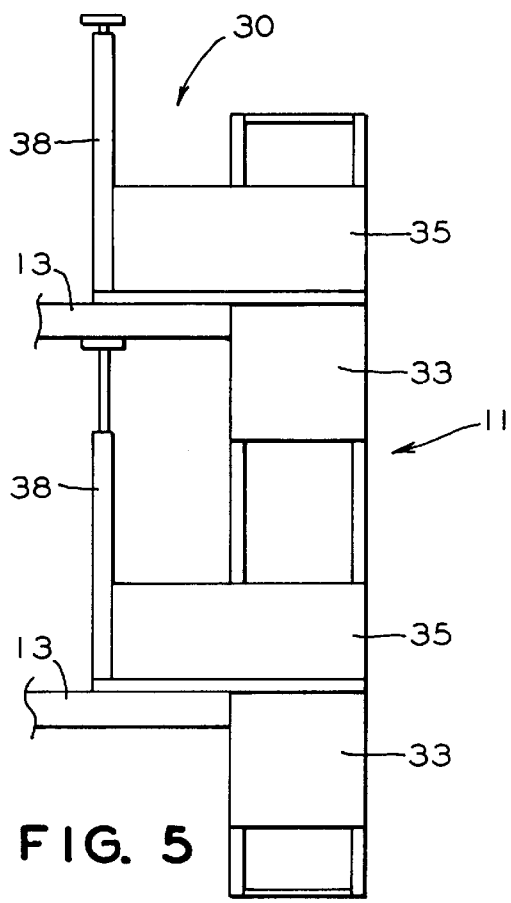
FIG. 5 is a diagrammatic side elevation of a larger portion of the chute of FIG. 4, showing two inlet structures.
Figure 7:
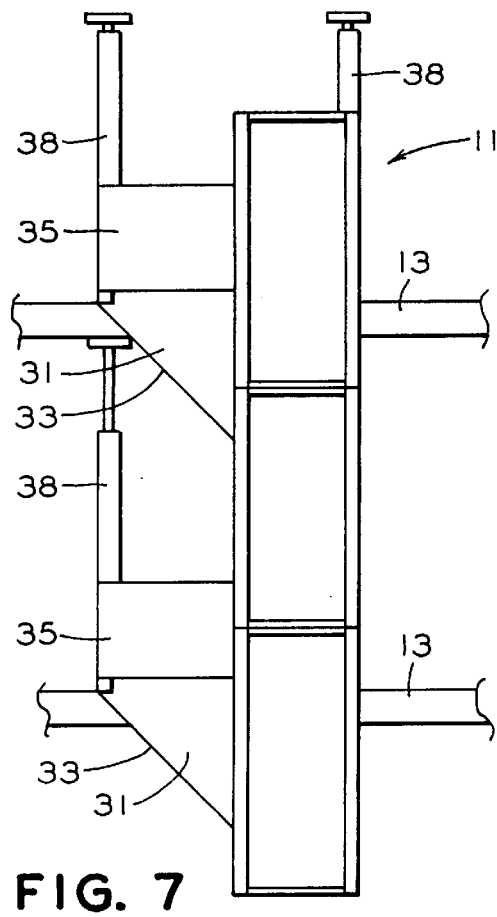
FIG. 7 is a diagrammatic rear elevation of the subject matter of FIG. 5.
Figure 6:
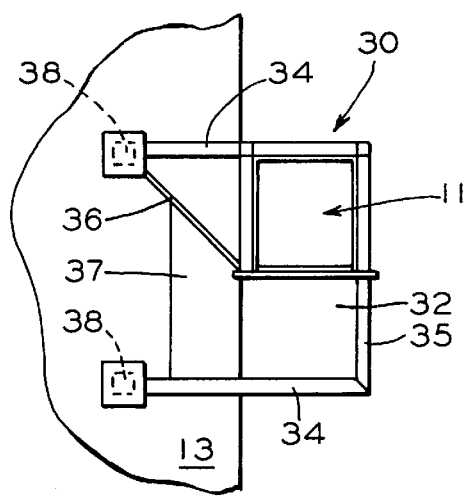
FIG. 6 is a plan view of the subject matter of FIG. 5.
Figure 8:
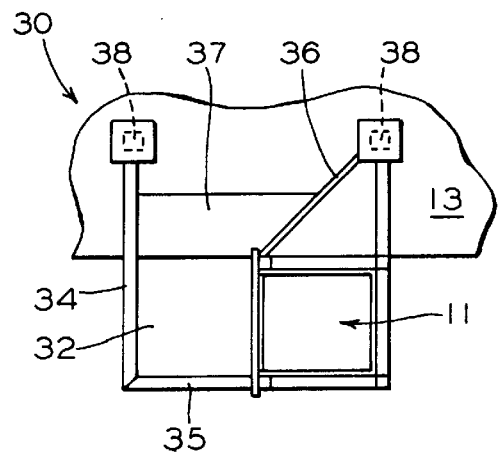
FIG. 8 is a plan view of the subject matter of FIG. 7.

The drop delivery chute illustrated by FIGS. 1 to 3 is a temporary rubbish disposal chute for use during the construction of a multi-storey building. It comprises a vertical duct 11 and a plurality of inlet structures 12. There is an inlet structure 12 at each of the above ground floors 13 of a multi-storey building under construction that is to be serviced by the chute.

Each inlet structure 12 is a steel fabrication comprising a skeletal frame with infill sheets welded or otherwise secured thereto to provide a unitary structure comprising a rear wall panel 14, a floor panel 15 and two forwardly diverging side wall panels 16.

Each inlet structure 12 is anchored to the corresponding floor 13, in the present instance by, for example, anchor studs driven into the floor through clearance holes 17 in the floor panel 15 and projecting frame members thereof.

The floor panel 15 defines an intake opening 18 and the inlet structure 12 further comprises an inclined race comprising two triangular race walls 19 and an inclined race floor 20. Thus it will be apparent that debris swept or tipped into the intake opening 18 will be fed by the race to the rear of, and then from, the inlet structure into the duct 11, provided the duct has an access opening coinciding with the rear edges of the race walls 19 and race floor 20.

For safety's sake the inlet structure may further comprise barrier means to prevent a person inadvertently falling into the intake opening 18. Those barrier means may comprise a hinged trap door or the like for the intake opening, but for preference are no more than a pair of judiciously spaced rails 21 fixedly spanning the intake opening 18 some distance above it.

The duct 11 comprises a plurality of trough sectioned body element 22 and a plurality of mutually similar cover element 23 and a cover plate 24. The body modules are preferably provided with four sockets at one end and four mating spigots 25 (see FIG. 2) at the other end, whereby the body modules may be mutually engaged end to end and secured together by self-fixing pins 26 or other appropriate through fasteners, to form a continuous, trough sectioned, duct body.

Each module 22 and element 23 is similar in construction to the inlet structure in that each comprises a fabricated frame and an infill panel or panels. In the case of the body modules 22, each comprises three rectangular walls, and, as the duct is oriented shown in the embodiment now being described, these constitute the rear wall 27 and side walls 28 of the assembled duct body. It will be apparent that other trough sectioned body modules could replace those illustrated herein. In particular, the entire module could be of semi-cylindrical shape or the rear wall 27 could be curved in cross-section. Such shapes might well be adopted in the case of, for example, moulded plastics modules.

The closure wall of the assembled duct body, being its front wall, is made up of the several cover elements 23, the cover plates 24 and the rear wall panels 14 of the inlet structures 12.

For preference the cover elements 23 and the inlet structures 12 are secured to the assembled body of the duct 11 by J-bolts 29 or other positionally adjustable clamping means.

This allows complete freedom in respect of the positioning of the inlet structures and the duct access openings to suit the floor spacing. In this regard it should be noted that a cover plate 24 may be provided immediately above each inlet structure 12 (FIG. 2) or immediately below same (FIG. 3) and may then be positively bolted to the trough sectioned body 22, because its effective length, when regarded as a part of the front wall of the duct, is determined by the extent to which it is overlapped by the contiguous cover element 23.

It should also be noted that no cover elements are required in register with the races, and indeed such elements are deliberately omitted to provide correctly positioned duct access openings.

For preference a lid 40 is provided for the top end of the assembled duct 11.

It is apparent from FIG. 3 that the duct 11 is spaced outboard of the edges of the floors 13 by a distance equal to the horizontal extent of the inlet structure races. This is necessary, when a straight race communicating with an access opening in the front wall of the duct is used, if the intake opening 18 is to be at floor level (as is desirable if debris on the floor is to be pushed or swept directly into the opening, or if it is to be tipped into same from a wheelbarrow). However this outboard spacing of the duct increases the stresses imposed on the inlet structures and increases the difficulty of installing the chute. Those deficiencies are addressed by the embodiment of the invention illustrated by FIGS. 4 to 8 without sacrificing the floor level position of the intake opening.

The duct 11 of this second mentioned embodiment is the same as the duct 11 of the first described embodiment and is not further described. It is however oriented differently with respect to the floors 13, in that the duct wall comprised of the cover modules is a side wall, whereas the body modules constitute the front, rear and opposite side wall of the duct.

Inlet structures 30 are similar in construction and function to inlet structures 12, but differ therefrom in a number of respects. In particular, the structure's side walls 34 no longer diverge and they extend beyond the edges of the floors 13, a rear wall 35 is added along with an internal guide wall 36, and the race, comprising triangular side walls 31 and an inclined floor 32, is positioned entirely outboard of the floor panel 37 and is oriented so as to feed into a duct access opening in a side wall of the duct 11. As may best be seen from FIG. 5 this enables the duct to be positioned closely adjacent or indeed in contact with the edges of the floors 13.

Furthermore the inlet structures 30 comprises screw adjustable or other extendable members 38 whereby the inlet structures may be clamped in position between two neighbouring floors 13. Such extendable members are well known per se, being widely used as adjustable props in tubular steel scaffolding supporting structures.

I claim:

1. A drop delivery chute comprising a duct which itself comprises a continuous trough sectioned body having an open face, and a plurality of cover elements each adapted to span the open face to constitute a respective part of a closure wall of the duct, and means to secure the cover elements to the body, which means permit the respective cover elements to be secured at any position along the length of the body as needed to form the closure wall; wherein each of a plurality of duct access openings in the closure wall is constituted by a gap between neighbouring spaced apart cover elements, and at least two inlet structures supporting the duct, each inlet structure being adapted to be fixedly mounted to a building floor and comprising means defining an intake opening and an inclined race extending from the intake opening to a corresponding duct access opening and wherein the spacing between neighboring duct access openings is established so as to bring each access opening into register with the race of a corresponding said inlet structure by means of a cover sheet in overlapping relationship with a said cover element which permits stepless adjustment in the longitudinal direction of the positioning of said duct access openings.

2. A chute according to claim 1 wherein the body comprises a plurality of open ended, trough sectioned body modules joined end to end.

3. A chute according to claim 1 wherein said each inlet structure is so adapted by means of at least two extendable members whereby the inlet structures may be clamped in position between two neighbouring floors.

4. A chute according to claim 1 wherein the spacing between neighboring duct access openings is established so as to bring each access opening into register with the race of a corresponding said inlet structure by means of a cover sheet of lesser width than a said cover element intermediate each pair of neighbouring access openings.

5. A chute according to claim 1 wherein each said inlet structure is constructed so that its inclined race feeds into a duct access opening situated in a side wall of the duct, being the closure wall when extending away from an edge of the floor on which said each inlet structure is mounted.

6. A chute according to any one of claims 1 to 5 wherein the duct body is clamped to the inlet structures by clamping means permitting stepless adjustment in the longitudinal direction of the duct of the position of the duct body relative to the inlet structures.

* * * * *